(12) United States Patent
Kobayashi et al.

(10) Patent No.: US 11,114,672 B2
(45) Date of Patent: *Sep. 7, 2021

(54) CARBON CATALYST, BATTERY ELECTRODE, AND BATTERY

(71) Applicants: NISSHINBO HOLDINGS INC., Tokyo (JP); NATIONAL UNIVERSITY CORPORATION GUNMA UNIVERSITY, Maebashi (JP)

(72) Inventors: Yoshikazu Kobayashi, Chiba (JP); Yuji Kubota, Chiba (JP); Jun-ichi Ozaki, Kiryu (JP); Takafumi Ishii, Kiryu (JP); Takuya Maie, Chiba (JP)

(73) Assignees: NISSHINBO HOLDINGS INC., Tokyo (JP); NATIONAL UNIVERSITY CORPORATION GUNMA UNIVERSITY, Maebashi (JP)

( * ) Notice: Subject to any disclaimer, the term of this patent is extended or adjusted under 35 U.S.C. 154(b) by 143 days.

This patent is subject to a terminal disclaimer.

(21) Appl. No.: 16/302,031

(22) PCT Filed: Jun. 1, 2017

(86) PCT No.: PCT/JP2017/020443
§ 371 (c)(1),
(2) Date: Nov. 15, 2018

(87) PCT Pub. No.: WO2017/209244
PCT Pub. Date: Dec. 7, 2017

(65) Prior Publication Data
US 2019/0190034 A1 Jun. 20, 2019

(30) Foreign Application Priority Data
Jun. 2, 2016 (JP) .............................. JP2016-110949

(51) Int. Cl.
*H01M 4/96* (2006.01)
*C01B 32/05* (2017.01)
(Continued)

(52) U.S. Cl.
CPC ............... *H01M 4/96* (2013.01); *B01J 23/80* (2013.01); *C01B 32/05* (2017.08);
(Continued)

(58) Field of Classification Search
None
See application file for complete search history.

(56) References Cited

U.S. PATENT DOCUMENTS

2003/0175580 A1* 9/2003 Ozaki ................. H01M 4/8657
429/492
2008/0076008 A1 3/2008 Ozaki et al.
(Continued)

FOREIGN PATENT DOCUMENTS

CN 103221129 A 7/2013
EP 2 497 573 A1 9/2012
(Continued)

OTHER PUBLICATIONS

Jan. 9, 2020 Extended Search Report issued in European Patent Application No. 17806794.8.
(Continued)

*Primary Examiner* — Guinever S Gregorio
(74) *Attorney, Agent, or Firm* — Oliff PLC

(57) ABSTRACT

A carbon catalyst, a battery electrode, and a battery, each exhibits excellent catalytic performance. A carbon catalyst contains two kinds of transition metals and has such a carbon structure that an interplanar spacing $d_{002}$, which is determined from a Bragg angle of one of three diffraction peaks $f_{broad}$, $f_{middle}$, and $f_{narrow}$ obtained by separating a diffraction peak around a diffraction angle (2θ) of 26° in an X-ray
(Continued)

diffraction pattern of powder X-ray diffraction with a CuKα ray, the one diffraction peak being the diffraction peak $f_{broad}$, is 0.374 nm or more.

9 Claims, 5 Drawing Sheets

(51) Int. Cl.
B01J 23/80 (2006.01)
H01M 4/90 (2006.01)
H01M 4/86 (2006.01)
H01M 8/10 (2016.01)

(52) U.S. Cl.
CPC ........... *H01M 4/8652* (2013.01); *H01M 4/90* (2013.01); *H01M 4/9041* (2013.01); *H01M 4/9083* (2013.01); *H01M 8/10* (2013.01)

(56) References Cited

U.S. PATENT DOCUMENTS

| | | |
|---|---|---|
| 2011/0243830 A1 | 10/2011 | Ozaki et al. |
| 2012/0231338 A1 | 9/2012 | Matsuzaka et al. |
| 2013/0217567 A1 | 8/2013 | Kishimoto et al. |
| 2015/0244000 A1 | 8/2015 | Ozaki et al. |
| 2017/0194653 A1 | 7/2017 | Imashiro et al. |

FOREIGN PATENT DOCUMENTS

| | | |
|---|---|---|
| EP | 2 562 860 A1 | 2/2013 |
| EP | 2 638 963 A1 | 9/2013 |
| JP | 2003-249231 A | 9/2003 |
| JP | 2007-207662 A | 8/2007 |
| JP | 2014-087794 A | 5/2014 |
| WO | 2010/064555 A1 | 6/2010 |
| WO | 2011/070975 A1 | 6/2011 |
| WO | 2012/121031 A1 | 9/2012 |
| WO | 2016/088716 A1 | 6/2016 |

OTHER PUBLICATIONS

Ishii et al., "A quantitative analysis of carbon edge sites and an estimation of graphene sheet size in high-temperature treated, non-porous carbons," Carbon, 2014, vol. 80, pp. 135-145.

Jul. 4, 2017 International Search Report issued in International Patent Application No. PCT/JP2017/020443.

* cited by examiner $L[nm] = a_0(2n+1)$

FIG.2

| | CARBON CATALYST | POWDER X-RAY DIFFRACTION | | | | | | HIGH-TEMPERATURE TPD | CATALYTIC PERFORMANCE | |
|---|---|---|---|---|---|---|---|---|---|---|
| | | (002) PLANE $f_{broad}$ | | | (100) PLANE $f_{100}$ | | | AVERAGE CARBON NETWORK PLANE SIZE L (nm) | $E_{O2}$ (V vs. NHE) | $i_{0.7}$ (mA/cm$^2$) |
| | | $2\theta$ (°) | $d_{002}$ (nm) | $L_c$ (nm) | $2\theta$ (°) | $L_a$ (nm) | | | | |
| EXAMPLE 1 | CA-I | 23.1 | 0.386 | 1.38 | 42.35 | 2.41 | | 19-33 | 0.831 | -1.80 |
| EXAMPLE 2 | CA-II | 24.4 | 0.365 | 1.16 | 42.35 | 2.90 | | 6-12 | 0.819 | -0.91 |
| EXAMPLE 3 | CA-III | 23.8 | 0.373 | 1.18 | 42.35 | 2.38 | | 16-28 | 0.750 | -0.07 |
| EXAMPLE 4 | CA-IV | 24.6 | 0.362 | 2.18 | 42.78 | 7.88 | | 34-44 | 0.698 | -0.01 |
| EXAMPLE 5 | CA-V | 23.8 | 0.374 | 1.21 | 42.35 | 2.85 | | 22-33 | 0.828 | -1.05 |
| EXAMPLE 6 | CA-VI | 23.5 | 0.378 | 1.28 | 42.35 | 2.70 | | 23-33 | 0.820 | -1.28 |
| EXAMPLE 7 | CA-VII | 23.0 | 0.387 | 1.30 | 42.35 | 2.43 | | 16-30 | 0.820 | -1.14 |
| EXAMPLE 8 | CA-VIII | 22.4 | 0.396 | 1.20 | 42.35 | 2.81 | | 18-32 | 0.825 | -1.85 |
| EXAMPLE 9 | CA-IX | 23.9 | 0.372 | 1.15 | 42.35 | 2.30 | | 15-26 | 0.710 | -0.02 |
| EXAMPLE 10 | CA-X | 24.0 | 0.370 | 1.13 | 42.35 | 2.32 | | 16-29 | 0.702 | -0.01 |
| EXAMPLE 11 | CA-XI | 23.9 | 0.373 | 1.05 | 42.35 | 2.82 | | 19-30 | 0.809 | -0.71 |

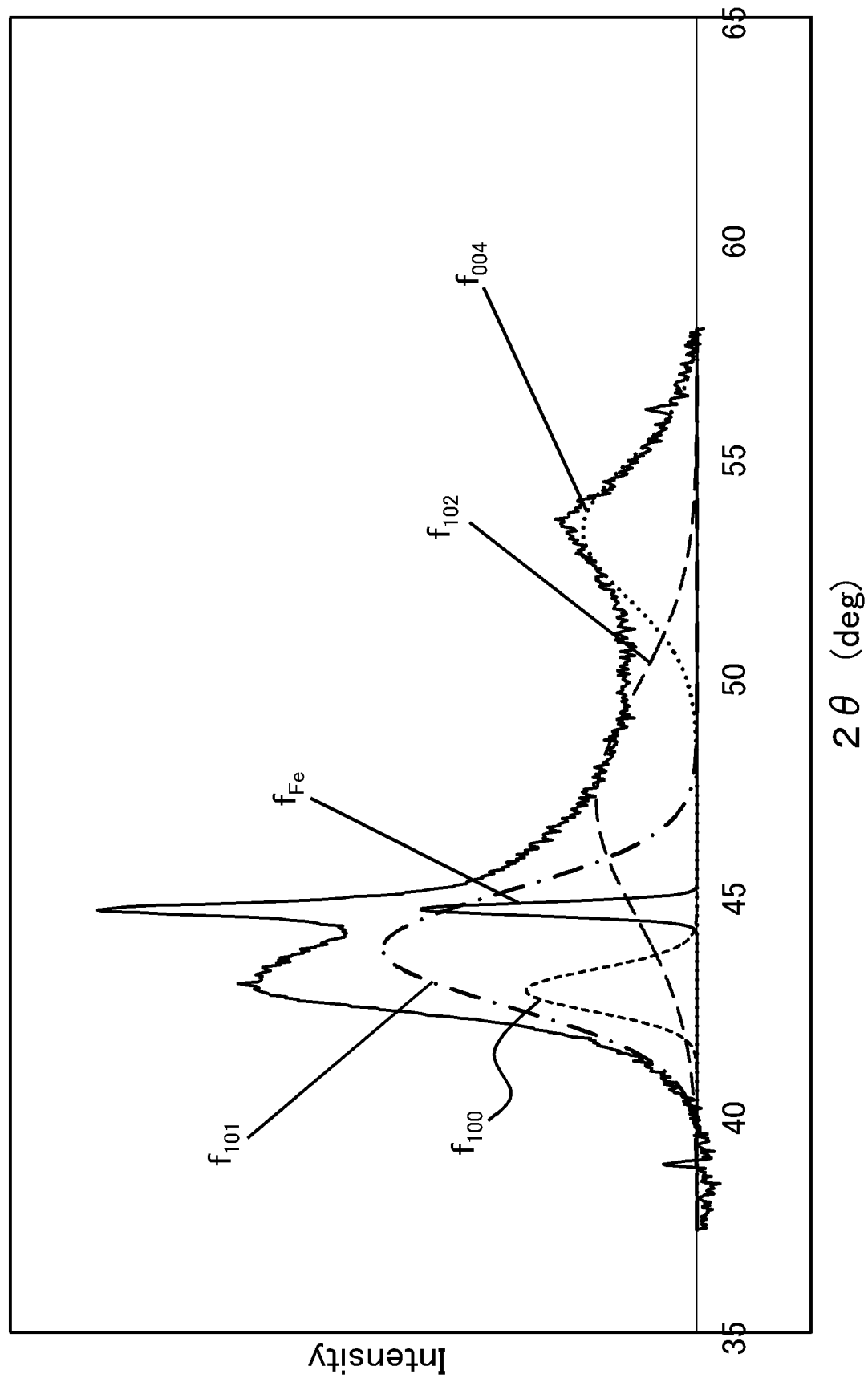

CARBON CATALYST, BATTERY ELECTRODE, AND BATTERY

TECHNICAL FIELD

The present invention relates to a carbon catalyst, a battery electrode, and a battery.

BACKGROUND ART

Currently, a platinum catalyst is used as a catalyst for an electrode of a fuel cell. However, there are many problems to be solved. For example, reserves of platinum are limited. In a polymer electrolyte fuel cell (PEFC), use of platinum increases cost. Therefore, an alternative technology which does not use platinum has been developed.

Specifically, for example, Patent Literature 1 discloses an electrode catalyst for a fuel cell which is formed of a carbonized material having a shell-like structure.

CITATION LIST

Patent Literature

[Patent Literature 1] JP 2007-207662 A

SUMMARY OF INVENTION

Technical Problem

However, the catalytic performance of the related-art carbon catalyst has not always been excellent.

The present invention has been made in view of the above-mentioned problem, and one of the objects of the present invention is to provide a carbon catalyst, a battery electrode, and a battery each having excellent catalytic performance.

Solution to Problem

According to one embodiment of the present invention for solving the above-mentioned problem, there is provided a carbon catalyst, including two kinds of transition metals, and a carbon structure having an interplanar spacing $d_{002}$ of 0.374 nm or more, the interplanar spacing $d_{002}$ being determined from a Bragg angle of a diffraction peak $f_{broad}$ which is one of three diffraction peaks $f_{broad}$, $f_{middle}$ and $f_{narrow}$ obtained by separating a diffraction peak around a diffraction angle ($2\theta$) of 26° in an X-ray diffraction pattern of powder X-ray diffraction with a CuKα ray. According to the one embodiment of the present invention, a carbon catalyst having excellent catalytic performance is provided.

The carbon structure of the carbon catalyst may have a crystallite size Lc of 1.19 nm or more and 2.17 nm or less, the crystallite size Lc being determined from the Bragg angle of the diffraction peak $f_{broad}$. The carbon structure of the carbon catalyst may have a crystallite size La of 2.39 nm or more and 2.89 nm or less, the crystallite size La being determined from a Bragg angle of a carbon (100) diffraction line $f_{100}$ obtained by separating a diffraction peak around a diffraction angle ($2\theta$) of 45° in the X-ray diffraction pattern of powder X-ray diffraction with a CuKα ray.

The carbon structure may have an average carbon network plane size L of 10 nm or more and 40 nm or less, the average carbon network plane size L being determined by temperature-programmed desorption analysis allowing a temperature increase up to 1,600° C.

The carbon catalyst may exhibit a voltage $E_{O2}$ of 0.820 V (vs. NHE) or more at a reduction current of −10 μA/cm² in an oxygen reduction voltammogram obtained by sweeping potential using a rotating disc electrode apparatus having a working electrode containing the carbon catalyst.

The carbon catalyst may exhibit an absolute value of a current density $i_{0.7}$ (mA/cm²) of 0.92 or more at a voltage of 0.7 V (vs. NHE) in an oxygen reduction voltammogram obtained by sweeping potential using a rotating disc electrode apparatus having a working electrode containing the carbon catalyst.

The carbon catalyst may include, as the two kinds of transition metals, two kinds of transition metals selected from a group consisting of scandium, titanium, vanadium, chromium, manganese, iron, cobalt, nickel, copper, and zinc.

According to one embodiment of the present invention for solving the above-mentioned problem, there is provided a battery electrode, including any one of the carbon catalysts. According to the one embodiment of the present invention, a battery electrode having excellent catalytic performance is provided.

According to one embodiment of the present invention for solving the above-mentioned problem, there is provided a battery, including the battery electrode. According to the one embodiment of the present invention, a battery having excellent catalytic performance is provided.

Advantageous Effects of Invention

According to the present invention, a carbon catalyst, a battery electrode, and a battery each having excellent catalytic performance are provided.

BRIEF DESCRIPTION OF DRAWINGS

FIG. 2 is an explanatory view for showing evaluation results of the characteristics of carbon catalysts in Examples according to one embodiment of the present invention.

FIG. 4B is an explanatory view for showing another example of the results of separation of a diffraction peak around a diffraction angle ($2\theta$) of 45° in an X-ray diffraction pattern with a CuKα ray of a carbon catalyst in Examples according to one embodiment of the present invention.

DESCRIPTION OF EMBODIMENTS

Figure 1:
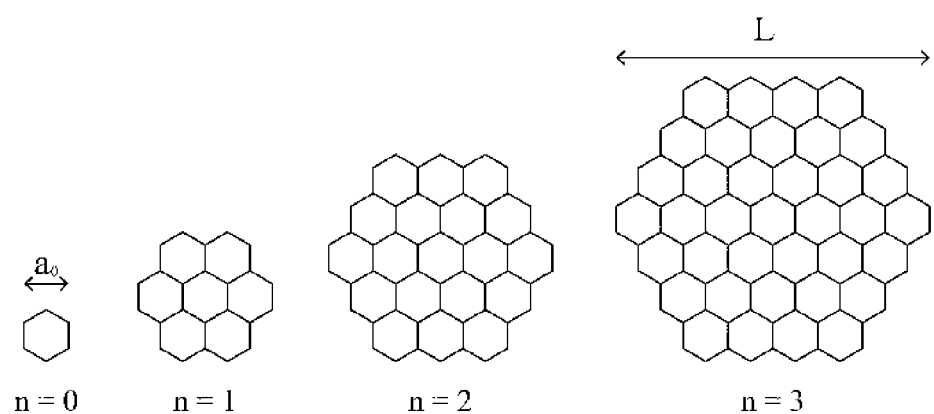
FIG. 1 is an explanatory view of a coronene model regarding an average carbon network plane size L.

Now, embodiments of the present invention will be described. The present invention is not limited to examples shown in these embodiments.

A carbon catalyst according to one embodiment of the present invention (hereinafter referred to as "catalyst of the present invention") contains two kinds of transition metals and a carbon structure having an interplanar spacing $d_{002}$ of 0.374 nm or more. The interplanar spacing $d_{002}$ is determined from a Bragg angle of a diffraction peak $f_{broad}$ which is one of three diffraction peaks $f_{broad}$, $f_{middle}$ and $f_{narrow}$ obtained by separating a diffraction peak around a diffraction angle (2θ) of 26° in an X-ray diffraction pattern of powder X-ray diffraction with a CuKα ray.

That is, the inventors of the present invention have performed extensive investigations into a carbon catalyst exhibiting excellent catalytic activity, and as a result, have independently found that a carbon catalyst containing two kinds of transition metals and a carbon structure having an interplanar spacing $d_{002}$ within a specific range, where the interplanar spacing $d_{002}$ is determined from the above-mentioned specific diffraction peak $f_{broad}$ in the X-ray diffraction pattern with a CuKα ray, has excellent catalytic performance. Thus, the inventors have completed the present invention.

As described above, the catalyst of the present invention contains two kinds of transition metals. The transition metals contained in the catalyst of the present invention are not particularly limited as long as the transition metals are two kinds of transition metals belonging to Group III to Group XII in the periodic table. For example, the transition metals are preferably two kinds of transition metals selected from a group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (e.g., cerium (Ce)), and actinoids, are more preferably two kinds of transition metals selected from a group consisting of Sc, Ti, V, Cr, Mn, Fe, Co, Ni, Cu, and Zn, and particularly preferably include two kinds of transition metals selected from a group consisting of Ti, Cr, Fe, Cu, and Zn. That is, for example, the catalyst of the present invention particularly preferably contains Fe and one kind selected from a group consisting of Ti, Cr, Cu, and Zn.

The catalyst of the present invention may further contain one or more kinds of elements selected from a group consisting of tin (Sn), lead (Pb), sodium (Na), and potassium (K). That is, the catalyst of the present invention may contain two kinds of transition metals and one or more kinds of elements selected from a group consisting of tin (Sn), lead (Pb), sodium (Na), and potassium (K), preferably contains two kinds of transition metals selected from a group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (e.g., cerium (Ce)), and actinoids, and one or more kinds of elements selected from a group consisting of tin (Sn), lead (Pb), sodium (Na), and potassium (K), more preferably contains two kinds of transition metals selected from a group consisting of Sc, Ti, V, Cr, Mn, Fe, Co, Ni, Cu, and Zn, and one or more kinds of elements selected from a group consisting of tin (Sn), lead (Pb), sodium (Na), and potassium (K), and particularly preferably contains two kinds of transition metals selected from a group consisting of Ti, Cr, Fe, Cu, and Zn, and one or more kinds of elements selected from a group consisting of tin (Sn), lead (Pb), sodium (Na), and potassium (K). That is, for example, the catalyst of the present invention particularly preferably contains: Fe; one kind selected from a group consisting of Ti, Cr, Cu, and Zn; and one or more kinds of elements selected from a group consisting of Sn and Pb.

The catalyst of the present invention is obtained by carbonizing a raw material containing an organic substance and two kinds of transition metals. That is, the catalyst of the present invention is a carbonized material of the raw material containing an organic substance and two kinds of transition metals. In addition, the catalyst of the present invention may be obtained by carbonizing a raw material containing an organic substance, two kinds of transition metals, and one or more kinds of elements selected from a group consisting of tin (Sn), lead (Pb), sodium (Na), and potassium (K). In this case, the catalyst of the present invention is a carbonized material of the raw material containing an organic substance, two kinds of transition metals, and one or more kinds of elements selected from a group consisting of tin (Sn), lead (Pb), sodium (Na), and potassium (K). The two kinds of transition metals contained in the catalyst of the present invention are derived from the raw material for the carbonized material. In addition, when the catalyst of the present invention contains one or more kinds of elements selected from a group consisting of tin (Sn), lead (Pb), sodium (Na), and potassium (K), the elements are also derived from the raw material for the carbonized material. The details of a production method for the catalyst of the present invention will be described later.

Further, as described above, the catalyst of the present invention has a carbon structure having the interplanar spacing $d_{002}$ of 0.374 nm or more, where the interplanar spacing $d_{002}$ is determined from the Bragg angle of the specific diffraction peak $f_{broad}$ in the X-ray diffraction pattern with a CuKα ray. Herein, the interplanar spacing $d_{002}$ is an interplanar spacing determined from a carbon (002) diffraction line in powder X-ray diffraction.

That is, in a case where the carbon catalyst has a laminated structure constituted of curved carbon network planes contributing to its catalytic activity, the carbon (002) diffraction line appears around a diffraction angle (2θ) of 26° (e.g., within the range of from 23° to 27° in the X-ray diffraction pattern with a CuKα ray. In the carbon (002) diffraction line, three kinds of diffraction lines, i.e., a (002) diffraction line derived from a graphite structure that is a high crystalline component, and two diffraction lines derived from a low crystalline component, are mixed. In view of the foregoing, through peak separation of X-ray diffraction data as performed in Examples to be described later, the diffraction peak around a diffraction angle (2θ) of 26° is separated into three diffraction peaks, i.e., $f_{broad}$ (broad peak), $f_{middle}$ (middle peak), and $f_{narrow}$ (narrow peak).

The broad peak $fb_{broad}$ is defined as a diffraction peak having a diffraction angle (2θ) of 24.0°±4.0° and a full width at half maximum of 10°±7.0°. The middle peak $f_{middle}$ is defined as a diffraction peak having a diffraction angle (2θ) of 26.2°±0.3° and a full width at half maximum of 2.0°±0.1°. The narrow peak $f_{narrow}$ is defined as a diffraction peak having a diffraction angle (2θ) of 26.5°±0.5° and a full width at half maximum of 0.3°±0.1°.

Then, the interplanar spacing $d_{002}$ is calculated by inserting a Bragg angle into the following Bragg's equation: $d_{002}=\lambda/2\sin\theta$. The Bragg angle is obtained by dividing the diffraction angle (2θ) of the broad peak $f_{broad}$ by 2, where the broad peak $f_{broad}$ is one of the three diffraction peaks obtained by the above-mentioned peak separation. In Bragg's equation, $d_{002}$ represents the carbon (002) interplanar spacing (nm), λ represents the wavelength of the CuKα ray (0.15418 nm), and θ represents the Bragg angle (radian).

The interplanar spacing $d_{002}$ of the catalyst of the present invention is not particularly limited as long as the interplanar spacing $d_{002}$ is 0.374 nm or more, but is, for example, preferably 0.376 nm or more, more preferably 0.380 nm or more, and particularly preferably 0.385 nm or more.

More specifically, the interplanar spacing $d_{002}$ of the catalyst of the present invention may be, for example, 0.374 nm or more and 0.420 nm or less, and is preferably 0.376 nm or more and 0.420 nm or less, more preferably 0.380 nm or more and 0.410 nm or less, and particularly preferably 0.385 nm or more and 0.400 nm or less.

In addition, the catalyst of the present invention may have a carbon structure having a crystallite size Lc of 1.19 nm or more and 2.17 nm or less. The crystallite size Lc is determined from the Bragg angle of the broad peak $f_{broad}$. Herein, the crystallite size Lc is the size of a crystallite in its c-axis direction determined from the carbon (002) diffraction line in powder X-ray diffraction.

The crystallite size Lc of the carbon structure of the catalyst of the present invention is calculated by inserting the Bragg angle of the broad peak $f_{broad}$ into the following Scherrer equation: $Lc=K\lambda/\beta\cos\theta$. The broad peak $f_{broad}$ is obtained by the above-mentioned peak separation. In the Scherrer equation, K represents the Scherrer constant (0.94), $\lambda$ represents the wavelength of the CuK$\alpha$ ray (0.15418 nm), $\beta$ represents the full width at half maximum (radian), and $\theta$ represents the Bragg angle (radian).

The crystallite size Lc of the catalyst of the present invention is not particularly limited as long as the crystallite size Lc is 1.19 nm or more and 2.17 nm or less, but is, for example, preferably 1.19 nm or more and 2.16 nm or less, more preferably 1.19 nm or more and 2.15 nm or less, and particularly preferably 1.19 nm or more and 2.14 nm or less.

In addition, the catalyst of the present invention may have a carbon structure having a crystallite size La of 2.39 nm or more and 2.89 nm or less. The crystallite size La is determined from the Bragg angle of a carbon (100) diffraction line $f_{100}$ obtained by separating a diffraction peak around a diffraction angle (2$\theta$) of 45° in the X-ray diffraction pattern of powder X-ray diffraction with a CuK$\alpha$ ray. Herein, the crystallite size La is the size of a crystallite in its a-axis direction determined from the carbon (100) diffraction line in powder X-ray diffraction.

That is, in a case where the carbon catalyst has a laminated structure constituted by curved carbon network planes contributing to its catalytic activity, a diffraction line derived from the carbon structure appears around a diffraction angle (2$\theta$) of 45° (e.g., within the range of from 36° to 60° in the X-ray diffraction pattern with a CuK$\alpha$ ray. In the diffraction line derived from the carbon structure, four kinds of diffraction lines, i.e., the (100) diffraction line, (101) diffraction line, (102) diffraction line, and (004) diffraction line, of the carbon structure are mixed.

In a case where the carbon catalyst contains iron as one of the transition metals, a diffraction line derived from iron also appears around a diffraction angle (2$\theta$) of 45°. That is, in this case, in the diffraction line derived from the carbon structure, five kinds of diffraction lines, which include the diffraction line derived from iron in addition to the above-mentioned four diffraction lines, are mixed.

In view of the foregoing, through peak separation of X-ray diffraction data as performed in Examples described later, for a carbon catalyst containing iron, the diffraction peak around a diffraction angle (2$\theta$) of 45° is separated into five diffraction peaks, i.e., a diffraction peak $f_{100}$ corresponding to the carbon (100) diffraction line, a diffraction peak $f_{101}$ corresponding to the carbon (101) diffraction line, a diffraction peak $f_{102}$ corresponding to the carbon (102) diffraction line, a diffraction peak $f_{004}$ corresponding to the carbon (004) diffraction line, and a diffraction peak $f_{Fe}$ corresponding to the diffraction line derived from iron. In addition, for a carbon catalyst containing no iron, the diffraction peak around a diffraction angle (2$\theta$) of 45° is separated into four diffraction peaks, i.e., $f_{100}$, $f_{101}$, $f_{102}$, and $f_{004}$.

The diffraction peak $f_{100}$ is defined as a diffraction peak having a diffraction angle (2$\theta$) of 42.0°±1.5° and a full width at half maximum of 3.0°±2.0°. The diffraction peak $f_{101}$ is defined as a diffraction peak having a diffraction angle (2$\theta$) of 44.0°±1.0° and a full width at half maximum of 5.0°±3.0°. The diffraction peak $f_{102}$ is defined as a diffraction peak having a diffraction angle (2$\theta$) of 49.0°±3.0° and a full width at half maximum of 7.0°±3.0°. The diffraction peak $f_{004}$ is defined as a diffraction peak having a diffraction angle (2$\theta$) of 54.0°±1.0° and a full width at half maximum of 2.0°±1.9°. The diffraction peak $f_{Fe}$ is defined as a diffraction peak having a diffraction angle (2$\theta$) of 44.0°±1.0° and a full width at half maximum of 0.5°±0.3°.

Then, the crystallite size La is calculated by inserting the Bragg angle ($\theta$) and full width at half maximum ($\beta$) of the diffraction peak $f_{100}$ into the following Scherrer equation: $La=K\lambda/\beta\cos\theta$. The diffraction peak $f_{100}$ is one of the four or five diffraction peaks obtained by the above-mentioned peak separation. In the Scherrer equation, K represents the Scherrer constant (0.94), $\lambda$ represents the wavelength of the CuK$\alpha$ ray (0.15418 nm), $\beta$ represents the full width at half maximum (radian), and $\theta$ represents the Bragg angle (radian).

The crystallite size La of the catalyst of the present invention is not particularly limited as long as the crystallite size La is 2.39 nm or more and 2.89 nm or less, but is, for example, preferably 2.39 nm or more and 2.88 nm or less, more preferably 2.39 nm or more and 2.86 nm or less, and particularly preferably 2.39 nm or more and 2.85 nm or less.

In addition, the catalyst of the present invention may have a carbon structure having an average carbon network plane size L of 10 nm or more and 40 nm or less. The average carbon network plane size L is determined by temperature-programmed desorption analysis allowing a temperature increase up to 1,600° C. (high-temperature TPD).

That is, in this embodiment, the total amount of a carbon edge surface of the carbon catalyst is calculated from desorbed gas quantification results of high-temperature TPD of the carbon catalyst using a temperature-programmed desorption analysis apparatus in which a temperature can be increased up to 1,600° C. (high-temperature TPD apparatus), and the average carbon network plane size L, which is determined from the amount, is calculated using a coronene model illustrated in FIG. 1. In the equation shown in FIG. 1, $a_0$ represents 0.2461 nm, which is the lattice constant of a graphite crystal in its a-axis direction.

The average carbon network plane size L of the catalyst of the present invention is not particularly limited as long as the average carbon network plane size L is 10 nm or more and 40 nm or less, but is, for example, preferably 11 nm or more and 39 nm or less, more preferably 12 nm or more and 38 nm or less, and particularly preferably 13 nm or more and 33 nm or less.

In addition, the catalyst of the present invention may exhibit a voltage $E_{o2}$ (oxygen reduction-starting potential) of 0.820 V (vs. NHE) or more with a reduction current of −10 μA/cm² flowing in an oxygen reduction voltammogram (data for showing a relationship between a voltage and a current density) obtained by sweeping potential using a rotating disc electrode apparatus having a working electrode containing the catalyst of the present invention.

In this case, the oxygen reduction-starting potential $E_{o2}$ is not particularly limited as long as the oxygen reduction-starting potential $E_{o2}$ is 0.820 V (vs. NHE) or more, but is, for example, preferably 0.821 V (vs. NHE) or more, more preferably 0.822 V (vs. NHE) or more, and particularly preferably 0.823V (vs. NHE) or more. The oxygen reduction-starting potential $E_{o2}$ may be, for example, 1.200 V (vs. NHE) or less.

In addition, the catalyst of the present invention may exhibit an absolute value of a current density $i_{0.7}$ (mA/cm$^2$) of 0.92 or more at a voltage of 0.7 V (vs. NHE) in an oxygen reduction voltammogram obtained by sweeping potential using a rotating disc electrode apparatus having a working electrode containing the catalyst of the present invention.

In this case, the absolute value of the current density $i_{0.7}$ (mA/cm$^2$) is not particularly limited as long as the absolute value is 0.92 or more, but is, for example, preferably 0.94 or more, more preferably 0.96 or more, and particularly preferably 0.98 or more. The absolute value of the current density $i_{0.7}$ (mA/cm$^2$) may be, for example, 3.00 or less.

As described above, the production method for the catalyst of the present invention includes carbonizing a raw material containing an organic substance and two kinds of transition metals. The raw material to be carbonized may further contain one or more kinds of elements selected from a group consisting of tin (Sn), lead (Pb), sodium (Na), and potassium (K).

The organic substance contained in the raw material is not particularly limited as long as the organic substance can be carbonized. That is, as the organic substance, for example, high-molecular-weight organic compounds (e.g., resins, such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the organic substance contains an organic compound containing a nitrogen atom in the molecule. When the catalyst of the present invention is a carbonized product of a raw material containing the nitrogen-containing organic substance, the carbon structure of the catalyst of the present invention contains a nitrogen atom.

The organic substance is specifically, for example, one or more kinds selected from a group consisting of a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type chelate resins), a polyamide-imide resin, pyrrole, polypyrrole, polyvinyl pyrrole, 3-methyl polypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylate, polymethacrylate, polymethacrylic acid, polyurethane, polyamidoamine, and polycarbodiimide.

The content of the organic substance in the raw material is not particularly limited as long as the content falls within a range in which the catalyst of the present invention is obtained, but may be, for example, 5 mass % or more and 90 mass % or less, and is preferably 10 mass % or more and 80 mass % or less.

As the transition metal, an elemental substance of the transition metal or a compound of the transition metal is used. As the metal compound, for example, one or more kinds selected from a group consisting of a metal salt, a metal oxide, a metal hydroxide, a metal nitride, a metal sulfide, a metal carbide, and a metal complex may be used.

The content of the transition metals in the raw material (sum of the contents of the two kinds of transition metals) is not particularly limited as long as the content falls within a range in which the catalyst of the present invention is obtained, but may be, for example, 1 mass % or more and 90 mass % or less, and is preferably 2 mass % or more and 80 mass % or less.

The content of the one or more kinds of elements selected from a group consisting of tin (Sn), lead (Pb), sodium (Na), and potassium (K) in the raw material (when the raw material contains two or more kinds of the elements, the sum of the contents of the two or more kinds of the elements) is not particularly limited as long as the content falls within a range in which the catalyst of the present invention is obtained, but may be, for example, 1 mass % or more and 90 mass % or less, and is preferably 2 mass % or more and 80 mass % or less.

The raw material may further contain a carbon material. In this case, the catalyst of the present invention is a carbonized material of the raw material containing the organic substance, the two kinds of transition metals, and the carbon material. As the carbon material, for example, a conductive carbon material is used. Specifically, for example, one or more kinds selected from a group consisting of carbon black, a carbon nanotube, a carbon nanohorn, a carbon fiber, a carbon fibril, and graphite powder are used.

The raw material to be carbonized is prepared by mixing at least the organic substance and the two kinds of transition metals. A method of mixing the raw material is not particularly limited, and for example, a mortar and a stirring device is used. The carbonization is performed by heating a raw material and keeping the raw material at a temperature at which the raw material is carbonized (hereinafter referred to as "carbonizing temperature"). The carbonizing temperature is not particularly limited as long as the raw material is carbonized. The carbonizing temperature may be, for example, 300° C. or more (e.g., 300° C. or more and 3,000° C. or less) , or 700° C. or more (e.g., 700° C. or more and 2,000° C. or less).

A temperature increase rate up to the carbonizing temperature is, for example, 0.5° C./min or more and 300° C./min or less. A period of time for keeping the raw material at the carbonizing temperature is, for example, 5 minutes or more and 24 hours or less. It is preferred that the carbonization be performed under the circulation of an inert gas, such as nitrogen.

In this embodiment, the carbonized material itself, which is obtained by the carbonization of the raw material as described above, may be used as the catalyst of the present invention, or a carbonized material obtained by subjecting the above-mentioned carbonized material to further treatment may be used as the catalyst of the present invention.

That is, the catalyst of the present invention may be obtained by, for example, subjecting the carbonized material to metal removal treatment. The metal removal treatment is treatment for reducing the amounts of metals derived from the raw material which are contained in the carbonized material. The metal removal treatment may be, for example, washing treatment with an acid or electrolytic treatment.

The catalyst of the present invention may be obtained by subjecting the carbonized material to the metal removal treatment, followed by heat treatment. That is, in this case, first, the carbonized material is subjected to the above-mentioned metal removal treatment, and then, the carbonized material which has already been subjected to the metal removal treatment is subjected to heat treatment.

The heat treatment after the metal removal treatment may be performed under conditions similar to those for the carbonization described above. That is, the temperature of the heat treatment after the metal removal treatment may be, for example, 300° C. or more (e.g., 300° C. or more and 3,000° C. or less), or 700° C. or more (e.g., 700° C. or more and 2,000° C. or less).

Even when the catalyst of the present invention is produced by a method including subjecting the carbonized material to the metal removal treatment, trace amounts of transition metals derived from the raw material remain in the catalyst of the present invention. The transition metals contained in the catalyst of the present invention may be detected by, for example, inductively coupled plasma (ICP) emission spectrophotometry.

A battery electrode according to one embodiment of the present invention (hereinafter referred to as "electrode of the present invention") includes the above-mentioned catalyst of the present invention. That is, the electrode of the present invention is, for example, an electrode carrying the catalyst of the present invention. Specifically, the electrode of the present invention is, for example, an electrode including an electrode base material and the catalyst of the present invention carried on the electrode base material.

The electrode of the present invention is, for example, an electrode for a fuel cell (e.g., a polymer electrolyte fuel cell) or an air cell. The electrode of the present invention is, for example, a cathode or an anode, preferably a cathode. That is, the electrode of the present invention is a cathode or anode for a fuel cell or an air cell, preferably a fuel cell cathode or an air cell cathode.

A battery according to one embodiment of the present invention includes the above-mentioned battery electrode. That is, the battery of the present invention is, for example, a fuel cell (e.g., a polymer electrolyte fuel cell) or air cell including the electrode of the present invention. The battery of the present invention may include a membrane electrode assembly including the electrode of the present invention. The battery of the present invention is a battery including the electrode of the present invention as a cathode or an anode, preferably a battery including the electrode of the present invention as a cathode. That is, the battery of the present invention is a fuel cell or air cell including the electrode of the present invention as a cathode or an anode, preferably a fuel cell or air cell including the electrode of the present invention as a cathode.

Next, specific Examples according to the embodiments of the present invention will be described.

EXAMPLES

Production of Carbon Catalyst 1.0 g of a polyacrylonitrile-polymethacrylic acid copolymer (PAN/PMA) was dissolved in 15 g of dimethylformamide, and thereby a solution (a) was prepared. In addition, 1.0 g of 2-methylimidazole and 5.78 g of zinc chloride ($ZnCl_2$) were added to 15 g of dimethylformamide to be dissolved, and thereby a solution (b) was prepared. Next, the solution (a) and the solution (b) were mixed, and 0.187 g of iron powder was further added thereto and mixed therein. After that, the resultant mixture was vacuum dried at 60° C. all day and night.

The above-mentioned mixture was heated in the atmosphere, the temperature was increased from room temperature to 150° C. in 30 minutes, and then the temperature was further increased from 150° C. to 220° C. over 2 hours. After that, the mixture was kept at 220° C. for 3 hours to be subjected to infusibilization. Further, silicon nitride balls each having a diameter of 10 mm were set in a planetary ball mill (P-7, manufactured by Fritsch Japan Co., Ltd.), and the mixture was pulverized with the planetary ball mill. Thus, a raw material to be carbonized was prepared.

Then, the raw material obtained as described above was placed in a quartz tube. The raw material was heated to 1,100° C. in an image furnace in a nitrogen atmosphere and kept at this temperature for 1 hour to be carbonized. Next, silicon nitride balls each having a diameter of 10 mm were set in a planetary ball mill (P-7, manufactured by Fritsch Japan Co., Ltd.), and the carbonized material obtained through the above-mentioned carbonization was pulverized with the planetary ball mill. Further, zirconia beads each having a diameter of 0.3 mm and methanol were loaded into a bead mill (manufactured by AIMEX Co., Ltd.), and the carbonized material was pulverized with the bead mill.

20 mL of concentrated hydrochloric acid was added to 1.0 g of the carbonized material obtained through the above-mentioned pulverization, and the resultant was stirred for 30 minutes. After that, the carbonized material was precipitated, and the solution was removed. This treatment was repeated several times, and then distilled water was added to the resultant, followed by stirring. The solution containing the carbonized material was filtered with a filtration membrane and washed with distilled water until the filtrate became neutral. The collected carbonized material was subjected to vacuum drying. Further, the dried carbonized material was pulverized with a mortar.

The carbonized material subjected to the metal removal treatment as described above was placed in a quartz tube. The carbonized material was heated to 700° C. in an image furnace in a nitrogen atmosphere and kept at that temperature for 1 hour to be subjected to heat treatment after the metal removal treatment. Then, the carbonized material after the heat treatment described above was pulverized with a ball mill. Thus, a carbon catalyst CA-I serving as a carbonized material in the form of powder was obtained.

A carbon catalyst CA-II was produced in the same manner as the carbon catalyst CA-I except that the carbonization temperature was changed to 800° C. A carbon catalyst CA-III was produced in the same manner as the carbon catalyst CA-I except that the iron powder was not used. A carbon catalyst CA-IV was produced in the same manner as the carbon catalyst CA-I except that 0.18 g of iron (III) chloride hexahydrate ($FeCl_3 \cdot 6H_2O$) was used instead of 5.78 g of zinc chloride ($ZnCl_2$) in the preparation of the solution (b), and the iron powder was not added when the solution (a) and the solution (b) were mixed.

A carbon catalyst CA-V was produced in the same manner as the carbon catalyst CA-I except that 0.112 g of copper (II) chloride ($CuCl_2$) was used instead of 5.78 g of zinc chloride ($ZnCl_2$) in the preparation of the solution (b), 0.047 g of the iron powder was used, and the carbonization temperature was changed to 800° C. A carbon catalyst CA-VI was produced in the same manner as the carbon catalyst CA-I except that 0.64 g of a titanium(IV) tetrachloride ($TiCl_4$)

aqueous solution and 8.0 g of tin(II) chloride (SnCl$_2$) were used instead of 5.78 g of zinc chloride (ZnCl$_2$) in the preparation of the solution (b). A carbon catalyst CA-VII was produced in the same manner as the carbon catalyst CA-I except that 0.89 g of chromium (III) chloride hexahydrate (CrCl$_3$·6H$_2$O) and 8.0 g of tin (II) chloride (SnCl$_2$) were used instead of 5.78 g of zinc chloride (ZnCl$_2$) in the preparation of the solution (b). A carbon catalyst CA-VIII was produced in the same manner as the carbon catalyst CA-I except that 0.33 g of copper (II) chloride (CuCl$_2$) and 6.7 g of lead(II) nitrate (Pb(NO$_3$)$_2$) were used instead of 5.78 g of zinc chloride (ZnCl$_2$) in the preparation of the solution (b).

A carbon catalyst CA-IX was produced in the same manner as the carbon catalyst CA-I except that 0.900 g of copper (II) chloride (CuCl$_2$) was used instead of 5.78 g of zinc chloride (ZnCl$_2$) in the preparation of the solution (b), and the iron powder was not used. A carbon catalyst CA-X was produced in the same manner as the carbon catalyst CA-I except that 1.3 g of a titanium(IV) tetrachloride (TiCl$_4$) aqueous solution was used instead of 5.78 g of zinc chloride (ZnCl$_2$) in the preparation of the solution (b), and the iron powder was not used. A carbon catalyst CA-XI was produced in the same manner as the carbon catalyst CA-I except that 12 g of tin(II) chloride (SnCl$_2$) and 6.0 g of lead (II) nitrate (Pb(NO$_3$)$_2$) were used instead of 5.78 g of zinc chloride (ZnCl$_2$) in the preparation of the solution (b).

Powder X-ray Diffraction

A sample of a carbon catalyst in the form of powder was placed in a Lindemann glass capillary ($\varphi$=0.5 mm, wall thickness: 0.01 mm), and tube sealing was performed under a vacuum state. Subsequently, the glass tube was fixed to a goniometer, and the goniometer was rotated to uniformly subject the sample to measurement.

That is, powder X-ray diffractometry (XRD) was performed using SPring-8 (beamline BL19B2). Of synchrotron radiation generated from an electron synchrotron, an X-ray at 24.8 keV, i.e., $\lambda$=0.0500 nm, was utilized. A large Debye-Scherrer camera attached to the beamline was used for detection, and an imaging plate was used as a detector. A sampling interval was set to 0.01°, an exposure time was set to 1 h, and a measuring angle range (2θ) was set to from 1° to 75°.

Then, the resultant diffraction pattern was converted to a diffraction angle (2θ) in the case of using a CuKα ray ($\lambda$=0.15418 nm) by the following equation: $\lambda_{syn}/\sin\theta_{syn} = \lambda_{CuK\alpha}/\sin\theta_{CuK\alpha}$. In the equation, $\lambda_{syn}$ represents the wavelength of the X-ray using the synchrotron (0.0500 nm), $\lambda_{CuK\alpha}$ represents the wavelength of the CuKα ray (0.15418 nm), $\theta_{syn}$ represents the Bragg angle (radian) of X-ray diffraction using the synchrotron, and $\theta_{CuK\alpha}$ represents the Bragg angle (radian) of X-ray diffraction using the CuKα ray.

In a case where the carbon catalyst has a laminated structure constituted by curved carbon network planes contributing to its catalytic activity, a carbon (002) diffraction line appears around a diffraction angle (2θ) of 26° (e.g., within the range of from 23° to 27° in the X-ray diffraction pattern with the CuKα ray. In the carbon (002) diffraction line, three kinds of diffraction lines, i.e., a (002) diffraction line derived from a graphite structure that is a high crystalline component, and two diffraction lines derived from a low crystalline component, are mixed. In view of the foregoing, through peak separation of X-ray diffraction data, the diffraction peak around a diffraction angle (2θ) of 26° was separated into three diffraction peaks, i.e., $f_{broad}$, $f_{middle}$, and $f_{narrow}$.

The peak separation was performed by approximating overlapping diffraction peaks by superimposition of Gaussian basic waveforms. For a diffraction pattern which had already been subjected to background correction, fitting was performed by optimizing the peak intensity, peak full width at half maximum, and peak position of a Gaussian function serving as each component. The background correction was performed by using a straight line connecting the vicinity of diffraction angles (2θ) of from 10° to 20° and the vicinity of diffraction angles (2θ) of from 30° to 40° as a background, and subtracting the background from each diffraction intensity.

The peak separation was performed by separating the diffraction peak around a diffraction angle 2θ of 26° (e.g., within the diffraction angle 2θ range of from 23° to 27°) (diffraction peak having a peak top around the diffraction angle 2θ of 26°) into three components, i.e., $f_{broad}$, $f_{middle}$ and $f_{narrow}$.

More specifically, the peak separation was performed by the following procedure. In the X-ray diffraction pattern with the CuKα ray which had already been subjected to the background correction described above, the diffraction peak having a peak top around a diffraction angle 2θ of 26° was approximated by superimposition of Gaussian basic waveforms, their peak intensity, peak full width at half maximum, and peak position were optimized, and three overlapping diffraction peaks included in the above-mentioned diffraction peak were each subjected to curve fitting. Thus, the peak separation was performed.

The curve fitting was performed so as to minimize a residual square sum. Herein, the residual square refers to the square of a residual at each diffraction angle measured. The residual square sum refers to the sum of such residual squares. The residual refers to a difference between the intensity of the diffraction peak having a peak top around a diffraction angle 2θ of 26° in the corrected X-ray diffraction pattern with the CuKα ray and the sum of the intensities of the three separated diffraction peaks ($f_{broad}$, $f_{middle}$, and $f_{narrow}$).

Through such peak separation, three diffraction peaks, i.e., two diffraction peaks $f_{broad}$ and $f_{middle}$ of a low crystalline component, and the diffraction peak $f_{narrow}$ of a high crystalline component, were obtained. The broad peak $f_{broad}$ was defined as a diffraction peak having a diffraction angle (2θ) of 24.0°±4.0° and a full width at half maximum of 10°±7.0°. The middle peak $f_{middle}$ was defined as a diffraction peak having a diffraction angle (2θ) of 26.2°±0.3° and a full width at half maximum of 2.0°±0.1. The narrow peak $f_{narrow}$ was defined as a diffraction peak having a diffraction angle (2θ) of 26.5°±0.5° and a full width at half maximum of 0.3°±0.1°.

Then, an interplanar spacing $d_{002}$ and a crystallite size Lc were calculated by analyzing the broad peak $f_{broad}$, which was one of the three diffraction peaks obtained by the above-mentioned peak separation.

That is, the interplanar spacing $d_{002}$ was calculated by inserting the Bragg angle of the broad peak $f_{broad}$ into the following Bragg's equation: $d_{002} = \lambda/2\sin\theta$, where the broad peak $f_{broad}$ was obtained by the above-mentioned peak separation. In Bragg's equation, $d_{002}$ represents the carbon (002) interplanar spacing (nm), $\lambda$ represents the wavelength of the CuKα ray (0.15418 nm), and θ represents the Bragg angle (radian).

The crystallite size Lc was calculated by inserting the Bragg angle of the broad peak $f_{broad}$ into the following Scherrer equation: $Lc=K\lambda/\beta\cos\theta$, where the broad peak $f_{broad}$ was obtained by the above-mentioned peak separation. In the Scherrer equation, K represents the Scherrer constant (0.94), λ represents the wavelength of the CuKα ray (0.15418 nm), β represents the full width at half maximum (radian), and θ represents the Bragg angle (radian).

In a case where the carbon catalyst has a laminated structure constituted by curved carbon network planes contributing to its catalytic activity, a diffraction line derived from the carbon structure appears around a diffraction angle (2θ) of 45° (e.g., within the range of from 36° to 60° in the X-ray diffraction pattern with the CuKα ray. In the diffraction line derived from the carbon structure, four kinds of diffraction lines, i.e., the (100) diffraction line, (101) diffraction line, (102) diffraction line, and (004) diffraction line of the carbon structure, are mixed.

In a case where the carbon catalyst contains iron as one of the transition metals, a diffraction peak derived from iron also appears around a diffraction angle (2θ) of 45°. That is, in this case, in the diffraction line derived from the carbon structure, five kinds of diffraction lines, including the diffraction line derived from iron in addition to the above-mentioned four diffraction lines, are mixed.

In view of the foregoing, for a carbon catalyst containing iron, by peak separation of X-ray diffraction data, the diffraction peak around a diffraction angle (2θ) of 45° was separated into five diffraction peaks, i.e., $f_{100}$, $f_{101}$, $f_{102}$, $f_{004}$, and $f_{Fe}$. On the other hand, for a carbon catalyst containing no iron, by peak separation of X-ray diffraction data, the diffraction peak around a diffraction angle (2θ) of 45° was separated into four diffraction peaks, i.e., $f_{100}$, $f_{101}$, $f_{102}$, and $f_{004}$.

The peak separation was performed by approximating overlapping diffraction peaks by superimposition of Gaussian basic waveforms. For a diffraction pattern which had already been subjected to background correction, fitting was performed by optimizing the peak intensity, peak full width at half maximum, and peak position of a Gaussian function serving as each component. A method for the background correction is not particularly limited as long as a baseline can be aligned. In this Example, the background correction was performed by subtracting an intensity at 37.33° from each diffraction intensity.

In a case where the carbon catalyst contained iron, peak separation was performed by separating the diffraction peak around a diffraction angle 2θ of 45° (e.g., within the diffraction angle 2θ range of from 36° to 60°) (diffraction peak having a peak top around the diffraction angle 2θ of 45°) into five components, i.e., $f_{100}$, $f_{101}$, $f_{102}$, $f_{004}$, and $f_{Fe}$.

More specifically, the peak separation was performed by the following procedure. In the X-ray diffraction pattern with the CuKα ray which had already been subjected to the background correction described above, the diffraction peak having a peak top around a diffraction angle 2θ of 45° was approximated by a superimposition of Gaussian basic waveforms, their peak intensity, peak full width at half maximum, and peak position were optimized, and five overlapping diffraction peaks included in the above-mentioned diffraction peak were each subjected to curve fitting. Thus, the peak separation was performed.

The curve fitting was performed so as to minimize a residual square sum. Herein, the residual square refers to the square of a residual at each diffraction angle measured. The residual square sum refers to the sum of such residual squares. The residual refers to a difference between the intensity of the diffraction peak having a peak top around a diffraction angle 2θ of 45° in the corrected X-ray diffraction pattern with the CuKα ray, and the sum of the intensities of the five separated diffraction peaks ($f_{100}$, $f_{101}$, $f_{102}$, $f_{004}$, and $f_{Fe}$).

Through such peak separation, five diffraction peaks were obtained. The diffraction peak $f_{100}$ was defined as a diffraction peak having a diffraction angle (2θ) of 42.0°±1.5° and a full width at half maximum of 3.0°±2.0°. The diffraction peak fin was defined as a diffraction peak having a diffraction angle (2θ) of 44.0°±1.0° and a full width at half maximum of 5.0°±3.0°. The diffraction peak $f_{102}$ was defined as a diffraction peak having a diffraction angle (2θ) of 49.0°±3.0° and a full width at half maximum of 7.0°±3.0°.

The diffraction peak $f_{004}$ was defined as a diffraction peak having a diffraction angle (2θ) of 54.0°±1.0° and a full width at half maximum of 2.0°±1.9°. The diffraction peak $f_{Fe}$ was defined as a diffraction peak having a diffraction angle (2θ) of 44.0°±1.0° and a full width at half maximum of 0.5°±0.3°.

In a case where the carbon catalyst did not contain iron, peak separation was performed by separating the diffraction peak around a diffraction angle 2θ of 45° (e.g., within the diffraction angle 2θ range of from 36° to 60°) (diffraction peak having a peak top around the diffraction angle 2θ of 45°) into four components, i.e., $f_{100}$, $f_{101}$, $f_{102}$, and $f_{004}$.

More specifically, the peak separation was performed by the following procedure. In the X-ray diffraction pattern with the CuKα ray which had already been subjected to the background correction described above, the diffraction peak having a peak top around a diffraction angle 2θ of 45° was approximated by superimposition of Gaussian basic waveforms, their peak intensity, peak full width at half maximum, and peak position were optimized, and four overlapping peaks included in the above-mentioned diffraction peak were each subjected to curve fitting. Thus, the peak separation was performed.

The curve fitting was performed so as to minimize a residual square sum. Herein, the residual square refers to the square of a residual at each diffraction angle measured. The residual square sum refers to the sum of such residual squares. The residual refers to a difference between the intensity of the diffraction peak having a peak top around a diffraction angle 2θ of 45° in the corrected X-ray diffraction pattern with the CuKα ray, and the sum of the intensities of the four separated diffraction peaks $f_{100}$, $f_{101}$, $f_{102}$, and $f_{004}$).

Through such peak separation, four diffraction peaks were obtained. The diffraction peak $f_{100}$ was defined as a diffraction peak having a diffraction angle (2θ) of 42.0°±1.5° and a full width at half maximum of 3.0°±2.0°. The diffraction peak $f_{101}$ was defined as a diffraction peak having a diffraction angle (2θ) of 44.0°±1.0° and a full width at half maximum of 5.0°±3.0°. The diffraction peak $f_{102}$ was defined as a diffraction peak having a diffraction angle (2θ) of 49.0°±3.0° and a full width at half maximum of 7.0°±3.0°. The diffraction peak $f_{004}$ was defined as a diffraction peak having a diffraction angle (2θ) of 54.0°±1.0° and a full width at half maximum of 2.0°±1.9°.

Then, a crystallite size La was calculated by analyzing $f_{100}$, which was one of the four kinds or five kinds of diffraction peaks obtained by the above-mentioned peak separation. That is, the crystallite size La was calculated by inserting the Bragg angle and full width at half maximum of the diffraction peak $f_{100}$ into the following Scherrer equation: $La=K\lambda/\beta\cos\theta$, where the diffraction peak $f_{100}$ was obtained by the above-mentioned peak separation. In the Scherrer equation, K represents the Scherrer constant (0.94), λ represents the wavelength of the CuKα ray (0.15418 nm), β represents the full width at half maximum (radian), and θ represents the Bragg angle (radian).

Temperature-Programmed Desorption Analysis

In this embodiment, temperature-programmed desorption analysis of a carbon catalyst was performed using a temperature-programmed desorption analysis apparatus in which a temperature increases up to 1,600° C. (high-temperature TPD apparatus). The high-temperature TPD apparatus is an apparatus in which a graphite crucible, which serves as a body to be heated, can be heated up to a high temperature of 1,600° C. or more by high frequency electromagnetic induction heating. The details of the high-temperature TPD apparatus are described in the journal Carbon (Takafumi Ishii, SuSumuKashihara, YasutoHoshikawa, Jun-ichi Ozaki, Naokatsu Kannari, Kazuyuki Takai, Toshiaki Enoki, Takashi Kyotani, Carbon, Volume 80, December 2014, Pages 135-145).

The carbon catalyst was placed in the high-temperature TPD apparatus, the carbon catalyst was heated under a high vacuum of $5 \times 10^{-5}$ Pa or less, and the amount of a desorbed gas was measured with a quadrupole mass spectrometer (QMS).

Specifically, first, 1 mg of the carbon catalyst was loaded into a crucible made of graphite, and the crucible was set in a quartz reaction tube attached to the high-temperature TPD apparatus. Next, the inside of the apparatus was evacuated with a turbomolecular pump, and evacuated to a pressure of $5 \times 10^{-5}$ Pa, and then the temperature was increased from room temperature to 1,600° C. at a temperature increase rate of 10° C./min. A gas desorbed during the temperature increase was detected, and a correlation between the temperature (axis of abscissa) and the detected intensity (axis of ordinate) was recorded. Then, the amount of the desorbed gas was determined. That is, the integrated value of the detected intensity (detected intensity area) of the gas from room temperature, at which heat treatment was started, to the temperature (1,600° C.), at which quantification was to be performed, was calculated for each case.

Meanwhile, a calibration curve which shows a correlation between the desorption amount of gas and the detected intensity area was prepared using predetermined amounts of a standard gas. In order to exactly distinguish between gas species having the same mass (e.g., CO, $N_2$, and $C_2H_4$ for a mass number of 28) included in the desorbed gas in the analysis of the desorbed gas from the sample with the QMS, fragment intensity ratios were investigated for various gas species ($H_2$, $H_2O$, CO, $CO_2$, $N_2$, HCN, $O_2$, $CH_4$, $C_2H_6$, $C_3H_6$, and $C_3H_8$) and utilized for qualitative analysis of the desorbed gas. Then, on the basis of the detected intensity area obtained by the measurement, and the calibration curve and the fragment intensity ratio, the desorption amount (emission amount) of the gas from the carbon catalyst was quantified.

Herein, the actual size of a carbon network plane constituting carbon may be evaluated on the basis of an average carbon network plane size L determined from the amount of an edge surface of carbon. In this embodiment, the total amount of the carbon edge surface was calculated from the desorbed gas quantification results of the high-temperature TPD of the carbon catalyst, and the average carbon network plane size L, which was determined from the amount, was calculated using a coronene model illustrated in FIG. 1. In the equation shown in FIG. 1, $a_0$ represents 0.2461 nm, which is the lattice constant of a graphite crystal in its a-axis direction.

In addition, it is known that a phenolic hydroxy group in an oxygen-containing compound is decomposed into carbon monoxide through a temperature increase to leave a hydrogen atom on a carbon edge. Accordingly, a hydrogen amount determined by the high-temperature TPD may include the contribution of the hydrogen of the phenolic hydroxy group. In addition, atoms in a carbon network plane include those incorporated into the carbon network plane like quaternary nitrogen other than pyridine or pyridone present on the carbon edge surface, and the quaternary nitrogen does not form the carbon edge surface. In order to exactly calculate the total amount of the edge surface, the phenolic hydroxy group and the quaternary nitrogen need to be taken into consideration. On the assumption that, in the high-temperature TPD, the phenolic hydroxy group is desorbed as CO and the quaternary nitrogen is desorbed as $N_2$, a range of the total amount ($N_{edge}$) of the edge surface of the carbon catalyst was calculated from the following two equations.

That is, the lower limit value $N_{edge}$ (Min) of the total amount of the edge surface was calculated by the following equation: $N_{edge}$(Min) [μmol/g]=$CO_2$ [μmol/g]+$H_2O$ [μmol/g]×2+$H_2$[μmol/g]×2+HCN [μmol/g]. In addition, the upper limit value $N_{edge}$ (Max) of the total amount of the edge surface was calculated by the following equation: $N_{edge}$ (Max) [μmol/g]=CO [μmol/g]+$CO_2$ [μmol/g]+$H_2O$ [μmol/g]×2+$H_2$ [μmol/g]×2+$N_2$ [μmol/g]×2+HCN [μmol/g]. In the equations, CO [μmol/g], $CO_2$ [μmol/g], $H_2O$ [μmol/g], $H_2$ [μmol/g], $N_2$[μmol/g], and HCN [μmol/g] represent the desorbed gas amounts of carbon monoxide, carbon dioxide, water, hydrogen, nitrogen, and hydrogen cyanide determined by the high-temperature TPD, respectively.

Meanwhile, the average carbon network plane size L is determined by the following equation using 12 g/mol as the atomic weight of a carbon atom and 0.2461 nm as the lattice constant of a graphite crystal in its a-axis direction: L[nm]= $2 \times 1/12 \times 0.2461/N_{edge}$ [μmol/g]. Here, the range of values of $N_{edge}$ is represented by the following expression on the basis of the values of $N_{edge}$ (Min) and $N_{edge}$ (Max) calculated as described above: $N_{edge}$ (Min) [μmol/g]<$N_{edge}$ [μmol/g]<$N_{edge}$ (Max) [μmol/g].

In view of the foregoing, the range of possible values of the average carbon network plane size L of the carbon catalyst was determined from the following expression: $2 \times 1/12 \times 0.2461/N_{edge}$ (Max) [μmol/g]<L[nm]<$2 \times 1/12 \times 0.2461/N_{edge}$ (Min) [μmol/g].

Catalytic Performance

The oxygen reduction activity of each carbon catalyst produced as described above was evaluated. First, to 5 mg of the carbon catalyst, 50 μL of a commercially available 5 wt % Nafion (trademark) solution (manufactured by Aldrich), and 500 μL of a solution obtained by mixing distilled water and isopropanol at a volume ratio of 8:2 were added, and then the resultant was subjected to ultrasonic treatment to provide a catalyst slurry.

Subsequently, the catalyst slurry was aspirated with a pipette and applied to a disc electrode (diameter: 4 mm) of a rotating disc electrode apparatus (RRDE-3A, manufactured by BAS Inc.) so that the amount of the catalyst carried per electrode unit area was 0.100 mg/cm², followed by drying. Thus, a working electrode was produced. A platinum electrode was used as a counter electrode, and a standard hydrogen electrode was used as a reference electrode. A 0.1 M perchloric acid ($HClO_4$) aqueous solution saturated with oxygen was used as an electrolyte solution.

Then, the electrodes were rotated at a rotational speed of 1,600 rpm, and a current density during potential sweep at a sweep rate of 0.5 mV/sec was recorded as a function of a potential. From the thus obtained oxygen reduction voltammogram, a voltage $E_{o2}$ (V vs. NHE) at a time when a reduction current of −10 µA/cm² flowed (oxygen reduction-starting potential), and a current density $i_{0.7}$ (mA/cm²) at a time when a voltage of 0.7 V (vs. NHE) was applied, were recorded.

Results

In FIG. 2, the evaluation results of the characteristics of the carbon catalysts of Example 1 to Example 11 are shown. That is, in FIG. 2, for each carbon catalyst, there are shown: as the results of powder X-ray diffraction with a CuKα ray, the diffraction angle 2θ (°) of the broad peak $f_{broad}$ obtained by separating the carbon (002) diffraction line, the interplanar spacing $d_{002}$ (nm) and the crystallite size Lc (nm) determined from the Bragg angle (radian) of the broad peak $f_{broad}$, the diffraction angle 2θ (°) of the carbon (100) diffraction line, and the crystallite size La (nm) determined from the Bragg angle (radian) of the carbon (100) diffraction line; as the result of the high-temperature TPD, the average carbon network plane size L (nm); and as the catalytic performance, the oxygen reduction-starting potential $E_{o2}$ (V vs. NHE) and the current density $i_{0.7}$ (mA/cm²).

Figure 3:
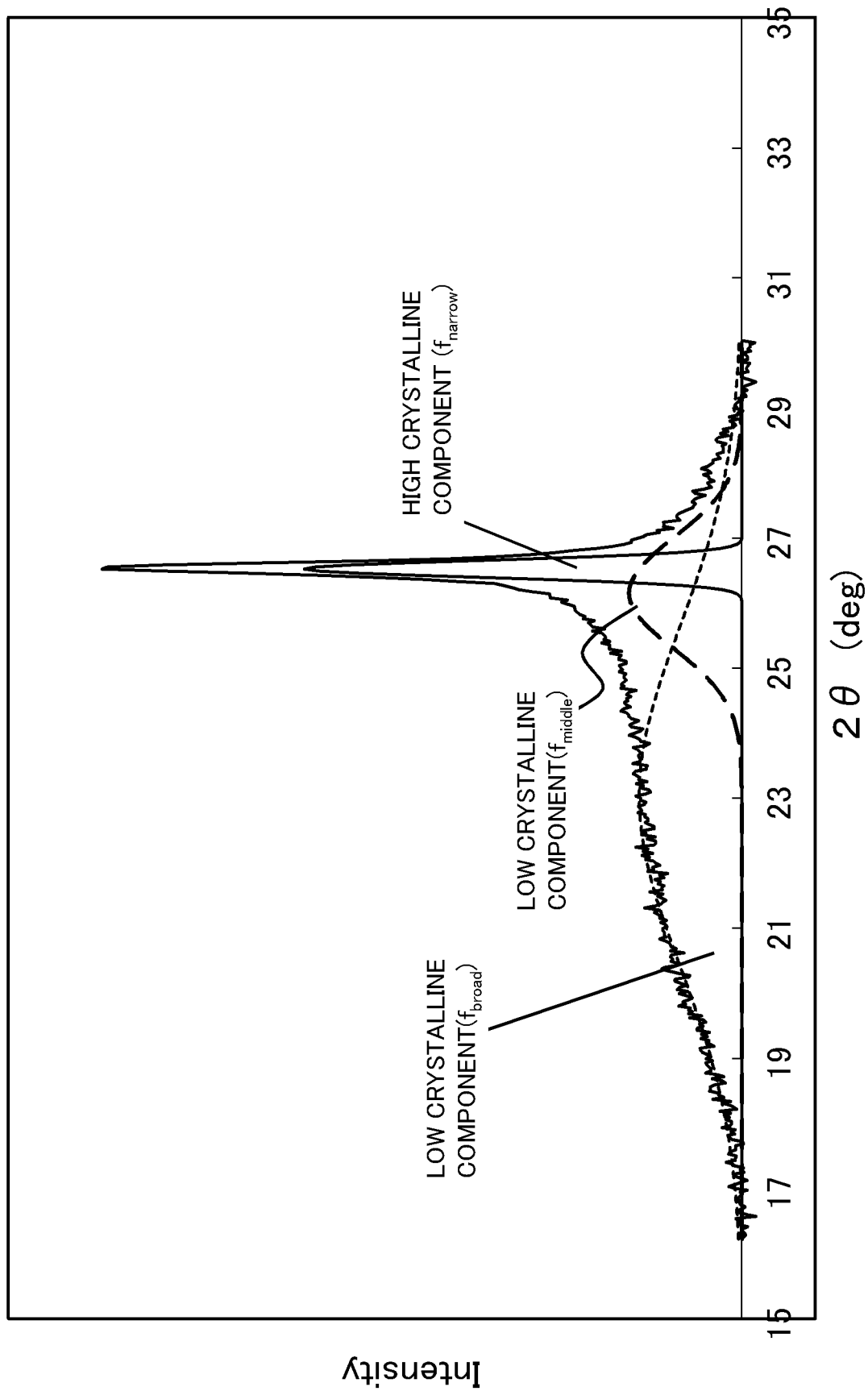
FIG. 3 is an explanatory view for showing an example of the results of separation of a diffraction peak around a diffraction angle ($2\theta$) of 26° in an X-ray diffraction pattern with a CuKα ray of a carbon catalyst in Examples according to one embodiment of the present invention.

In FIG. 3, the results of the separation of the diffraction peak around a diffraction angle (2θ) of 26° in the X-ray diffraction pattern with a CuKα ray for the carbon catalyst CA-I of Example 1 are shown. As shown in FIG. 3, through the peak separation, three diffraction peaks $f_{broad}$, $f_{middle}$ and $f_{narrow}$ were obtained.

Figure 4A:
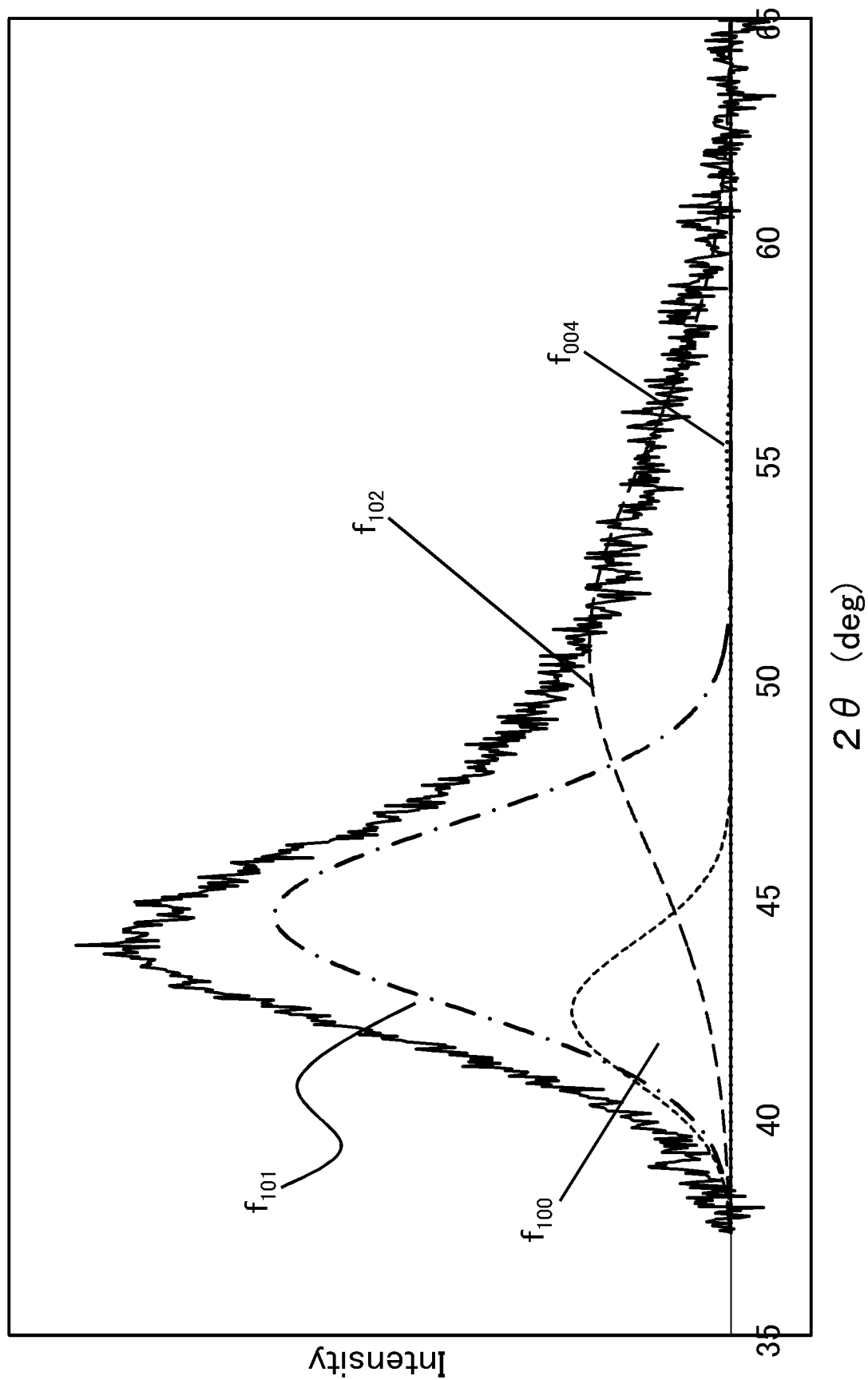
FIG. 4A is an explanatory view for showing an example of the results of separation of a diffraction peak around a diffraction angle ($2\theta$) of 45° in an X-ray diffraction pattern with a CuKα ray of a carbon catalyst in Examples according to one embodiment of the present invention.

In FIG. 4A, the results of the separation of the diffraction peak around a diffraction angle (2θ) of 45° in the X-ray diffraction pattern with a CuKα ray for the carbon catalyst CA-III of Example 3 are shown. As shown in FIG. 4A, through the peak separation, four diffraction peaks $f_{100}$, $f_{101}$, $f_{102}$, and $f_{004}$ were obtained. In FIG. 4B, the results of the separation of the diffraction peak around a diffraction angle (2θ) of 45° in the X-ray diffraction pattern with a CuKα ray for the carbon catalyst CA-IV of Example 4 are shown. As shown in FIG. 4B, through the peak separation, five diffraction peaks $f_{100}$, $f_{101}$, $f_{102}$, $f_{004}$, and $f_{Fe}$ were obtained.

As shown in FIG. 2, the catalytic performance of the carbon catalyst CA-I of Example 1 was remarkably high compared to that of any other carbon catalyst of Example 2 to Example 4 and Example 9 to Example 11. That is, the oxygen reduction-starting potential $E_{o2}$ in the case of using each of the carbon catalysts of Example 2 to Example 4 and Example 9 to Example 11 was 0.819 (V vs. NHE) or less, whereas the oxygen reduction-starting potential $E_{o2}$ in the case of using the carbon catalyst of Example 1 was remarkably large, specifically, 0.831 (V vs. NHE).

In addition, the absolute value of the current density $i_{0.7}$ (mA/cm²) in the case of using each of the carbon catalysts of Example 2 to Example 4 and Example 9 to Example 11 was 0.91 or less, whereas the absolute value of the current density $i_{0.7}$ (mA/cm²) in the case of using the carbon catalyst CA-I of Example 1 was 1.80, which was remarkably large.

Further, the catalytic performance of each of the carbon catalysts of Example 5 to Example 8 was also high compared to that of any other carbon catalyst of Example 2 to Example 4 and Example 9 to Example 11. In particular, the oxygen reduction-starting potential $E_{o2}$ in the case of using the carbon catalyst of Example 5 was 0.828 (V vs. NHE), which was remarkably large. In addition, the absolute value of the current density $i_{0.7}$ (mA/cm²) in the case of using each of the carbon catalysts of Example 6 to Example 8 was 1.14 or more and 1.85 or less, which was remarkably large.

As shown in FIG. 2, the interplanar spacing $d_{002}$ of the carbon catalyst CA-I of Example 1 having high catalytic performance based on the broad peak $f_{broad}$ was 0.386 nm, whereas the interplanar spacing $d_{002}$ of each of the carbon catalysts of Example 2 to Example 4 and Example 9 to Example 11 was 0.373 nm or less.

The interplanar spacing $d_{002}$ of each of the carbon catalysts of Example 5 to Example 8 was 0.374 nm or more and 0.396 nm or less. In particular, the interplanar spacing $d_{002}$ of each of the carbon catalysts of Example 6 to Example 8 having a remarkably large absolute value of the current density $i_{0.7}$ (mA/cm²) was 0.378 nm or more and 0.396 nm or less.

The crystallite size Lc of the carbon catalyst CA-I of Example 1 based on the broad peak $f_{broad}$ was 1.38 nm, whereas the crystallite size Lc of each of the carbon catalysts of Example 2 and Example 3 was 1.18 nm or less, and the crystallite size Lc of the carbon catalyst of Example 4 was 2.18 nm.

The crystallite size Lc of each of the carbon catalysts of Example 5 to Example 8 was 1.20 nm or more and 1.30 nm or less, whereas the crystallite size Lc of each of the carbon catalysts of Example 9 to Example 11 was 1.15 nm or less.

The crystallite size La of the carbon catalyst CA-I of Example 1 based on the diffraction peak $f_{100}$ corresponding to the carbon (100) diffraction line was 2.41 nm, whereas the crystallite size La of the carbon catalyst CA-II of Example 2 was 2.90 nm, the crystallite size La of the carbon catalyst CA-III of Example 3 was 2.38 nm, and the crystallite size La of the carbon catalyst CA-IV of Example 4 was 7.88 nm.

The crystallite size La of each of the carbon catalysts of Example 5 to Example 8 was 2.43 nm or more and 2.85 nm or less, whereas the crystallite size La of each of the carbon catalysts of Example 9 to Example 11 was 2.30 nm or more and 2.82 nm or less.

With regard to the average carbon network plane size L determined by the high-temperature TPD measurement, the average carbon network plane size L of the carbon catalyst CA-I of Example 1 was 19 nm or more and 33 nm or less, whereas the average carbon network plane size L of the carbon catalyst CA-II of Example 2 was 6 nm or more and 12 nm or less, the average carbon network plane size L of the carbon catalyst CA-III of Example 3 was 16 nm or more and 28 nm or less, and the average carbon network plane size L of the carbon catalyst CA-IV of Example 4 was 34 nm or more and 44 nm or less.

Further, the average carbon network plane size L of each of the carbon catalysts of Example 5 to Example 8 was 16 nm or more and 33 nm or less, whereas the average carbon network plane size L of each of the carbon catalysts of Example 9 to Example 11 was 15 nm or more and 30 nm or less.

The invention claimed is:
1. A carbon catalyst, comprising:
two kinds of transition metals; and
a carbon structure having an interplanar spacing $d_{002}$ of 0.374 nm or more, the interplanar spacing $d_{002}$ being determined from a Bragg angle of a diffraction peak $f_{broad}$ which is one of three diffraction peaks $f_{brothreead}$, $f_{middle}$, and $f_{narrow}$ obtained by separating a diffraction peak around a diffraction angle (2θ) of 26° in an X-ray diffraction pattern of the carbon structure by powder X-ray diffraction with a CuKα ray, wherein:

the diffraction peak $f_{broad}$ has a diffraction angle (2θ) of 24.0°±4.0°, the diffraction peak $f_{middle}$ has a diffraction angle (2θ) of 26.2°±0.3°, and the diffraction $f_{narrow}$ peak has a diffraction angle (2θ) of 26.5°±0.5°.

2. The carbon catalyst according to claim 1, wherein the carbon structure has a crystallite size Lc of 1.19 nm or more and 2.17 nm or less, the crystallite size Lc being determined from the Bragg angle of the diffraction peak $f_{broad}$.

3. The carbon catalyst according to claim 1, wherein the carbon structure has a crystallite size La of 2.39 nm or more and 2.89 nm or less, the crystallite size La being determined from a Bragg angle of a carbon (100) diffraction line $f_{100}$ obtained by separating a diffraction peak around a diffraction angle (2θ) of 45° in the X-ray diffraction pattern of powder X-ray diffraction with a CuKα ray.

4. The carbon catalyst according to claim 1, wherein the carbon structure has an average carbon network plane size L of 10 nm or more and 40 nm or less, the average carbon network plane size L being determined by temperature-programmed desorption analysis allowing a temperature increase up to 1,600° C.

5. The carbon catalyst according to claim 1, wherein the carbon catalyst exhibits a voltage $E_{O2}$ of 0.820 V (vs. NHE) or more at a reduction current of −10 μA/cm² in an oxygen reduction voltammogram obtained by sweeping potential using a rotating disc electrode apparatus having a working electrode containing the carbon catalyst.

6. The carbon catalyst according to claim 1, wherein the carbon catalyst exhibits an absolute value of a current density $i_{0.7}$ (mA/cm²) of 0.92 or more at a voltage of 0.7 V (vs. NHE) in an oxygen reduction voltammogram obtained by sweeping potential using a rotating disc electrode apparatus having a working electrode containing the carbon catalyst.

7. The carbon catalyst according to claim 1, wherein the carbon catalyst comprises, as the two kinds of transition metals, two kinds of transition metals selected from a group consisting of scandium, titanium, vanadium, chromium, manganese, iron, cobalt, nickel, copper, and zinc.

8. A battery electrode, comprising the carbon catalyst of claim 1.

9. A battery, comprising the battery electrode of claim 8.

* * * * *